(12) United States Patent
Biesinger et al.

(10) Patent No.: US 9,963,158 B2
(45) Date of Patent: May 8, 2018

(54) CARRIER TRANSPORTER

(71) Applicant: Munchkin, Inc., Van Nuys, CA (US)

(72) Inventors: Quinn Michael Biesinger, Los Angeles, CA (US); Thomas E. Birkert, West Hills, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days. days.

(21) Appl. No.: 15/417,165

(22) Filed: Jan. 26, 2017

(65) Prior Publication Data
US 2017/0210406 A1 Jul. 27, 2017

Related U.S. Application Data

(60) Provisional application No. 62/287,068, filed on Jan. 26, 2016.

(51) Int. Cl.
*B62B 1/14* (2006.01)
*B62B 1/12* (2006.01)
*B62B 7/00* (2006.01)
*B62B 5/06* (2006.01)

(52) U.S. Cl.
CPC ............... *B62B 1/125* (2013.01); *B62B 1/14* (2013.01); *B62B 5/067* (2013.01); *B62B 7/006* (2013.01); *B62B 2202/42* (2013.01); *B62B 2203/44* (2013.01); *B62B 2205/14* (2013.01); *B62B 2205/30* (2013.01); *B62B 2206/06* (2013.01)

(58) Field of Classification Search
CPC ....... B62B 1/125; B62B 1/14; B62B 2203/44; B62B 2206/06; B62B 2205/12; B62B 2205/33
See application file for complete search history.

(56) References Cited

U.S. PATENT DOCUMENTS

| | | | |
|---|---|---|---|
| 571,133 A | 3/1896 | Hoffman | |
| 3,043,603 A | 7/1962 | Major | |
| 3,998,476 A * | 12/1976 | Kazmark, Sr. | B62B 1/125 16/113.1 |
| 4,335,895 A | 6/1982 | Walker | |
| 4,407,521 A * | 10/1983 | Zeitlin | B62B 1/125 280/35 |
| 4,478,429 A * | 10/1984 | Adams | B62B 1/14 280/47.29 |

(Continued)

OTHER PUBLICATIONS

BRICA. "roll 'n go car seat transporter", [online], 2012 [retrieved on Mar. 17, 2017]. Retrieved from the Internet: <URL:http://www.munchkin.com/media/wysiwyg/pdf/65005_Instructions.pdf>.

(Continued)

*Primary Examiner* — Katy M Ebner
(74) *Attorney, Agent, or Firm* — Robert Z. Evora, Esq.; Christian Lek

(57) ABSTRACT

A carrier transporter is described which is retractable into a low-profile configuration, and extendable to accommodate a carrier or child seat. An adjustable height bar positions a securing device to coincide with a belt path of the carrier and allow a strap to be lead through the belt path and re-secured back to the bar through a buckle. The base of the carrier is supported by an extendable base platform having grip padding to further secure the base to the transporter. The base platform and wheels move together when retracting the transporter and move away from each other when extending the transporter.

17 Claims, 11 Drawing Sheets

(56) References Cited

U.S. PATENT DOCUMENTS

| | | | | |
|---|---|---|---|---|
| 4,523,773 | A * | 6/1985 | Holtz | B62B 1/125 16/113.1 |
| 4,591,183 | A * | 5/1986 | Gordon | B62B 1/125 280/47.29 |
| 4,754,985 | A * | 7/1988 | Im | B62B 1/125 280/40 |
| 4,917,392 | A * | 4/1990 | Ambasz | B62B 1/125 280/40 |
| 4,993,727 | A * | 2/1991 | vom Braucke | B62B 1/12 280/40 |
| 5,178,404 | A * | 1/1993 | Chen | B62B 1/125 16/113.1 |
| 5,294,145 | A * | 3/1994 | Cheng | B62B 1/125 280/47.28 |
| 5,312,006 | A * | 5/1994 | Lag | B62B 1/12 211/195 |
| 5,348,325 | A | 9/1994 | Abrams | |
| 5,351,984 | A * | 10/1994 | Cheng | B62B 1/125 280/47.18 |
| 5,464,244 | A * | 11/1995 | Tsai | B62B 1/125 280/47.24 |
| 5,513,873 | A * | 5/1996 | Chen | B62B 1/125 16/113.1 |
| 5,549,318 | A * | 8/1996 | Ho | B62B 1/125 280/47.27 |
| 5,573,211 | A * | 11/1996 | Wu | B62B 1/06 248/230.8 |
| 5,797,617 | A * | 8/1998 | Lin | B62B 1/125 190/18 A |
| 5,803,471 | A * | 9/1998 | DeMars | B62B 1/125 280/40 |
| 5,951,037 | A * | 9/1999 | Hsieh | B62B 1/125 280/47.29 |
| 5,984,327 | A * | 11/1999 | Hsieh | A45C 13/385 280/38 |
| 6,003,884 | A * | 12/1999 | Chang | A45C 13/385 280/47.24 |
| 6,012,729 | A * | 1/2000 | Lin | B62B 1/125 280/37 |
| 6,247,710 | B1 * | 6/2001 | Luberda | B62B 1/14 280/47.18 |
| 6,425,599 | B1 * | 7/2002 | Tsai | B62B 1/125 280/40 |
| 6,447,002 | B1 * | 9/2002 | Fang | A45C 13/385 280/47.29 |
| D522,708 | S | 6/2006 | Chang | |
| 7,100,976 | B1 * | 9/2006 | Desalve | A45C 13/385 297/129 |
| 7,658,389 | B2 | 2/2010 | Ostrow | |
| 9,403,546 | B1 * | 8/2016 | Su | B62B 1/12 |
| 2003/0189318 | A1 * | 10/2003 | Clark | B62B 1/14 280/652 |
| 2004/0129520 | A1 * | 7/2004 | Wolters | A45C 9/00 190/18 A |
| 2005/0023781 | A1 * | 2/2005 | Ortega | B62B 1/125 280/47.24 |
| 2005/0099104 | A1 * | 5/2005 | Johnson | A45C 5/14 312/282 |
| 2005/0127625 | A1 * | 6/2005 | Zimmer | B62B 1/125 280/47.27 |
| 2005/0285359 | A1 * | 12/2005 | Wang | B62B 1/125 280/47.29 |
| 2006/0055134 | A1 * | 3/2006 | McLoughlin | B62B 1/10 280/47.28 |
| 2006/0071435 | A1 * | 4/2006 | Zwack | B62B 1/264 280/47.27 |
| 2006/0071436 | A1 * | 4/2006 | O'Connor | A45C 5/143 280/47.29 |
| 2006/0261564 | A1 * | 11/2006 | Chuang | B62B 1/125 280/47.27 |
| 2007/0052188 | A1 * | 3/2007 | Steadman | B62B 1/14 280/47.131 |
| 2007/0257454 | A1 * | 11/2007 | Ostrow | B60N 2/2848 280/33.993 |
| 2007/0273111 | A1 * | 11/2007 | Kim | A45C 5/146 280/30 |
| 2008/0088117 | A1 * | 4/2008 | Tsai | B62B 1/125 280/655 |
| 2009/0026734 | A1 * | 1/2009 | Holzman | B62B 1/125 280/652 |
| 2010/0327562 | A1 * | 12/2010 | Kasuya | A45C 5/14 280/651 |
| 2011/0221146 | A1 * | 9/2011 | Leung | B62B 1/12 280/47.17 |
| 2015/0035259 | A1 * | 2/2015 | Umbro | B62B 1/12 280/654 |
| 2015/0123363 | A1 * | 5/2015 | Tsai | B62B 1/042 280/47.29 |
| 2015/0208780 | A1 * | 7/2015 | Avery | A45C 13/385 280/652 |
| 2015/0291194 | A1 * | 10/2015 | Robinson | B62B 1/26 280/47.18 |
| 2016/0068174 | A1 * | 3/2016 | Hsieh | B62B 1/06 280/47.18 |
| 2016/0068175 | A1 * | 3/2016 | Hsieh | B62B 1/10 410/97 |
| 2017/0113826 | A1 * | 4/2017 | Ristoski | B65B 67/1205 |
| 2017/0173444 | A1 * | 6/2017 | Condoianis | A63C 11/026 |

OTHER PUBLICATIONS

BricaInc, Youtube. "BRICA Roll 'n. Go Car Seat Transporter" [online], Apr. 25, 2012 [retrieved on Mar. 21, 2017]. Retrieved from the Internet: <URL:https://www.youtube.com/watch?v=ZTvgz-Oqec0>.

International Search Report and Written Opinion for PCT/US2017/015201, International Filing Date Jan. 26, 2017, dated Apr. 14, 2017 (pp. 13).

* cited by examiner

CARRIER TRANSPORTER

CROSS REFERENCE TO RELATED APPLICATIONS

This application claims priority to U.S. Provisional Patent Application Ser. No. 62/287,068, filed Jan. 26, 2016; the content of which is hereby incorporated by reference herein in its entirety into this disclosure.

TECHNICAL FIELD

The subject disclosure relates generally to transport devices. In particular, the subject disclosure relates to transporters for infant carriers.

BACKGROUND

Conventional carriers for seating and transporting young infants and toddlers have eased some of the burden on parents and caretakers in transporting delicate yet heavy bodies. Often, these carriers will have a cradle-like area where the infant is strapped down, and a hard shell to securely support the body of the infant. Further, a handle or other carrying projection eases the transportability of the carrier. Although these carriers have made it much easier to transport infants without having to carry the infant, their sturdy, protective nature adds even more weight to the weight of the infant who must be transported. Thus, parents and caretakers now have to handle the weight of the infant and the carrier when traveling with the infant. This burden becomes even more pronounced during air, train, or bus travel where there is limited storage area in a conventional carryon area for a stroller or other bulky devices for carrying infants. Thus, parents and caretakers have a never-ending burden of transporting infants in a safe and effective manner, while still trying to minimize the weight and bulk of the devices used to do so.

SUMMARY OF THE SUBJECT DISCLOSURE

The present subject disclosure provides a novel device which serves to assist in carrying an infant by attaching secure legs to a conventional car carrier. The device is versatile, easy to use, and low profile allowing for easy folding and securing of the device when not in use, and a quick set up when needed for use.

In one exemplary embodiment, the present subject matter is a transporter. The transporter includes a carry handle; a telescopic handle extendable from the carry handle; a base connected to the carry handle through an elongated shaft; a bar positioned on the elongated shaft, the bar having a securing device to secure an object thereto, wherein the bar is moveable between the carry handle and the base; and a base platform extending from the base.

In another exemplary embodiment, the present subject matter is a transporter. The transporter includes a carry handle; a telescopic handle extendable from the carry handle; a base connected to the carry handle through an elongated shaft; a bar positioned on the elongated shaft, the bar having a strap and a buckle to secure a carrier thereto by connecting with its belt path, wherein the bar is moveable at pre-determined positions between the carry handle and the base, and includes a release button thereon to release the bar from any of the pre-determined positions; and a base platform extending from the base.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present subject disclosure will now be described in greater detail with reference to the figures.

Figure 1:
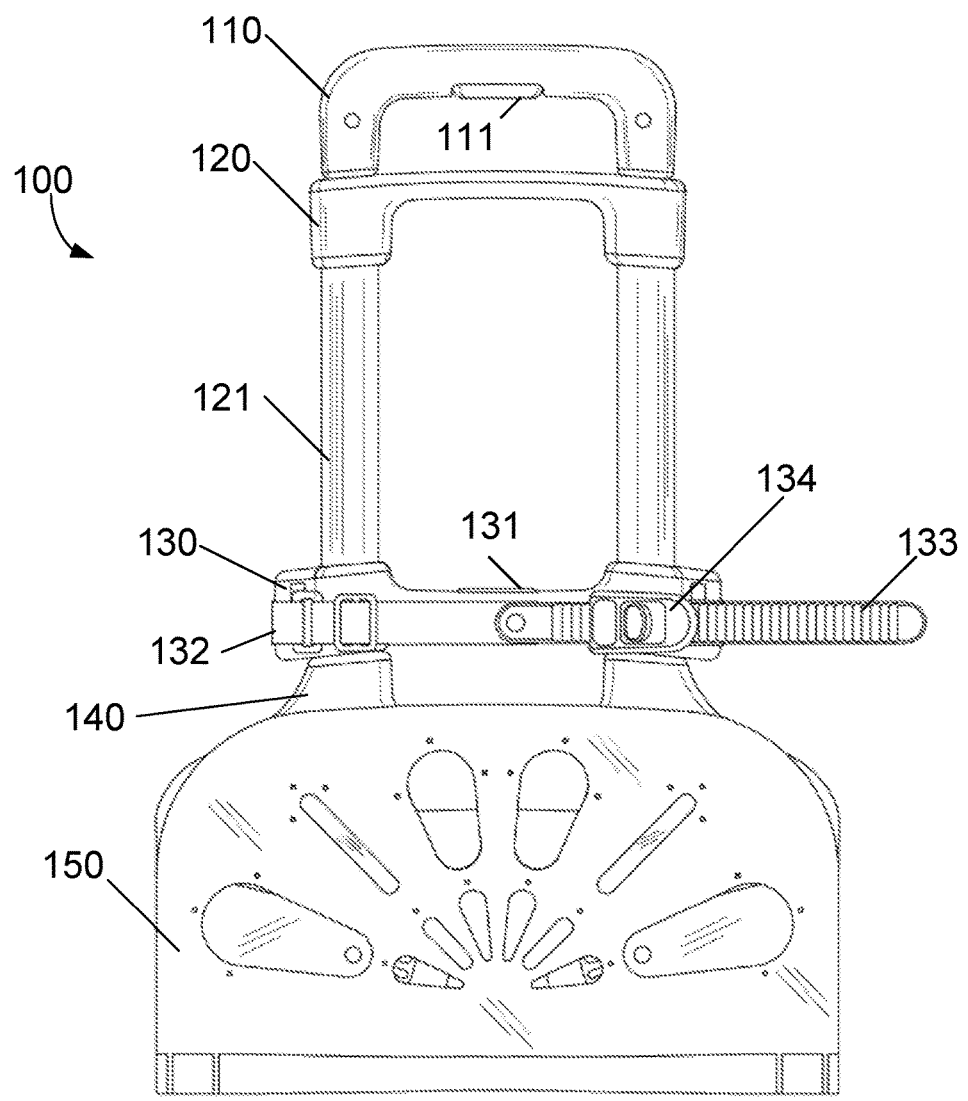
FIG. 1 illustrates a front view of a retracted carrier transporter device, according to an exemplary embodiment of the present subject disclosure.

In one exemplary embodiment of the present subject matter, a retractable carrier transporter device assembly 100 is shown in FIG. 1. The device 100 is shown in its fully retracted configuration, which includes a telescopic handle 110, whose vertical position may be controlled by a handle release button 111, abutting a stationary carry handle 120. A pair of hollow vertical tubes 121 connects the carry handle 120 with the base structure 140. The vertical tubes 121 are fixed in length and serve as the backbones of the device 100. An adjustable bar 130 is adapted to slide along the entire vertical length of the vertical tubes 121. The limits of movement of the adjustable bar 130 are defined by the carry handle 120 and the base structure 140. An adjustable bar release button 131 serves to unlock the adjustable bar from various desired positions along the vertical tube 121. The adjustable bar 130 includes a securing mechanism 132, which may be any mechanism that can secure an object to the device 100. In one exemplary embodiment, the securing mechanism 132 is a strap 133 with locking buckle 134. Other securing mechanisms are possible and within the purview of the present subject disclosures. A hinged base platform 150 is connected to the base structure 140 and is designed to fold back into the retracted device 100 to create a low profile device 100 when not in use or while being transported without a carrier.

Figure 2A:
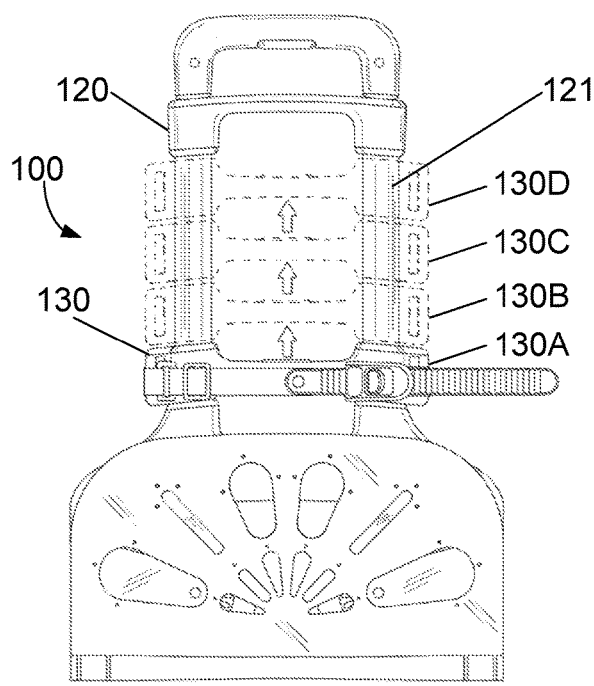
FIGS. 2A-2B illustrate a front view of a retracted carrier transporter with adjustable bar positions, according to an exemplary embodiment of the present subject disclosure.
Figure 2B:
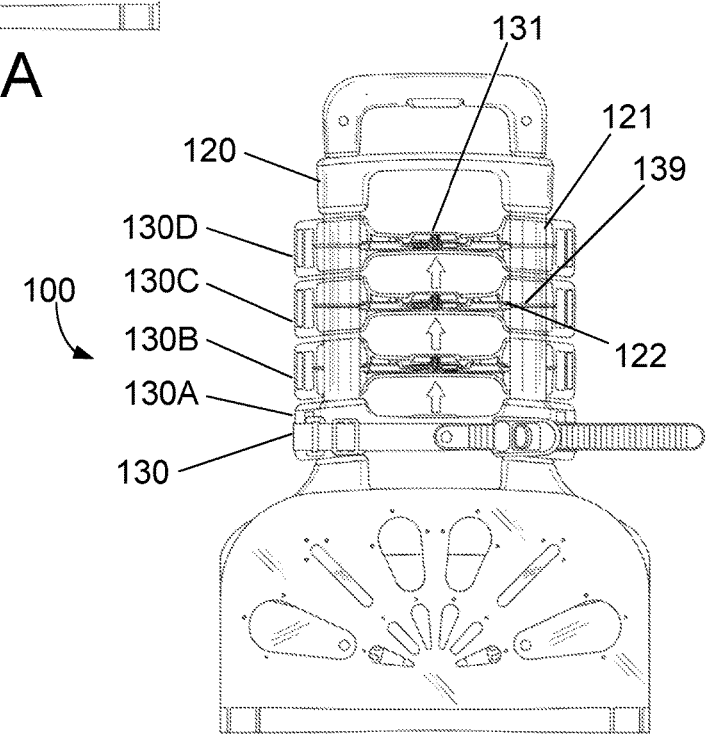
Figure 2C:
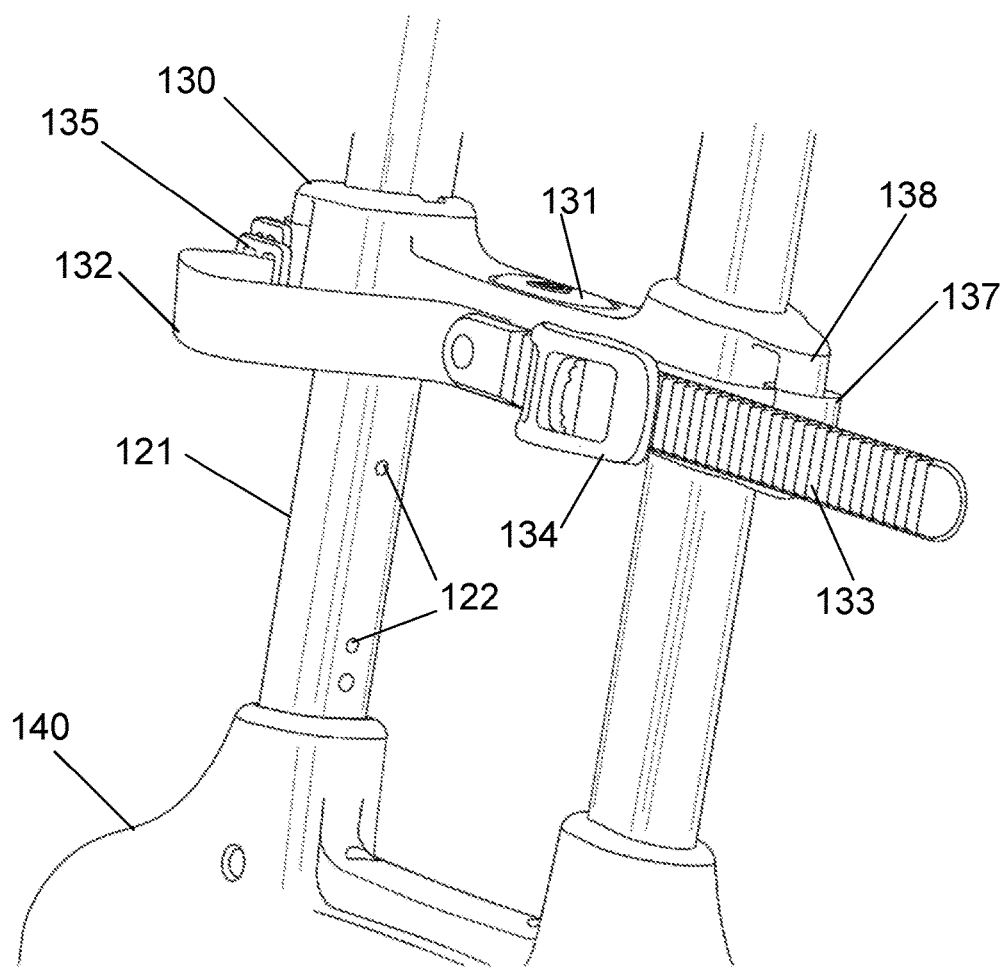
FIG. 2C illustrates an adjustable bar, according to an exemplary embodiment of the present subject disclosure.

FIGS. 2A-2C show the flexibility of the position of the adjustable bar 130 along the vertical length of the vertical tubes 121. Various positions, 130A, 130B, 130C, 130D, etc., may be locked into by engaging release button 131 to disengage the horizontal bar 139 contained within the body of the adjustable bar 131 from corresponding holes 122 (see FIG. 2C) which secure the adjustable bar 130 in place. To move the adjustable bar 130 between various height positions along the length of the vertical tube 131, the adjustable bar release button 131 may be depressed and held in to thereby disengage the horizontal bar 139 from the holes 122 on the interior vertical portions of vertical tubes 121. Once a desired height is determined, the adjustable bar release button 131 is released, thereby allowing the horizontal bar 139 to engage with the closest set of retaining holes 122 on the vertical bar 121. Once such close holes 122 are secured by the horizontal bar 139, the adjustable bar 130 is secured in a particular position 130A, 130B, 130C, or 130D, and locked into that position until the adjustable bar release button 131 is depressed again, thereby disengaging the horizontal bar 139 from the holes 122 in the vertical tube 121. Although the figures show four different vertical positions for the adjustable bar 130, more positions are also possible, or even less, and depend on the spacing of the holes 122, and the thickness of the adjustable bar 130.

FIG. 2C illustrates a closer perspective view of the adjustable bar 130 positioned on vertical tube 121. The adjustable bar release button 131 allows movement of the adjustable bar 130 along the vertical length of tubes 121 and securing at particular retaining holes 122. The securing mechanism 132 is shown having a strap 133 and buckle 134 and secured by a hoop 137 to vertical posts 138 on the adjustable bar 130. A length adjusting loop 135 allows for the strap 133 to lengthen and shorten in accommodating various sized carriers 200.

Figure 3A:
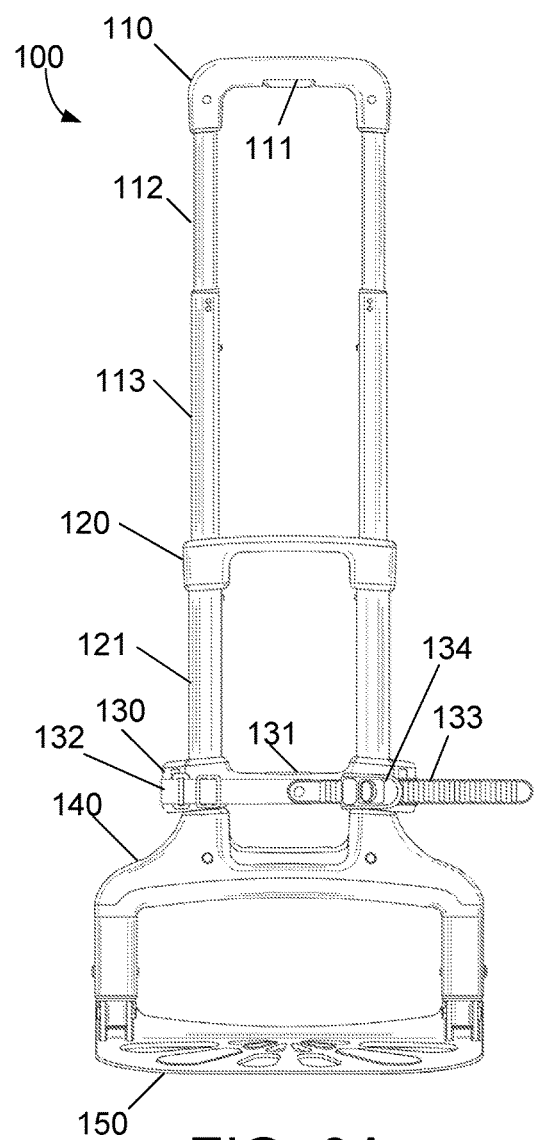
FIGS. 3A-3B illustrate front and side views of an extended carrier transporter device, according to an exemplary embodiment of the present subject disclosure.
Figure 3B:
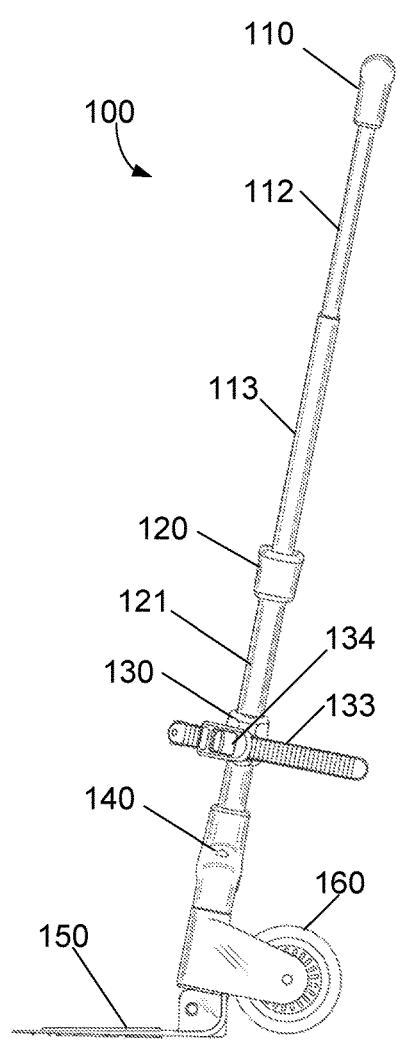
Figure 7:
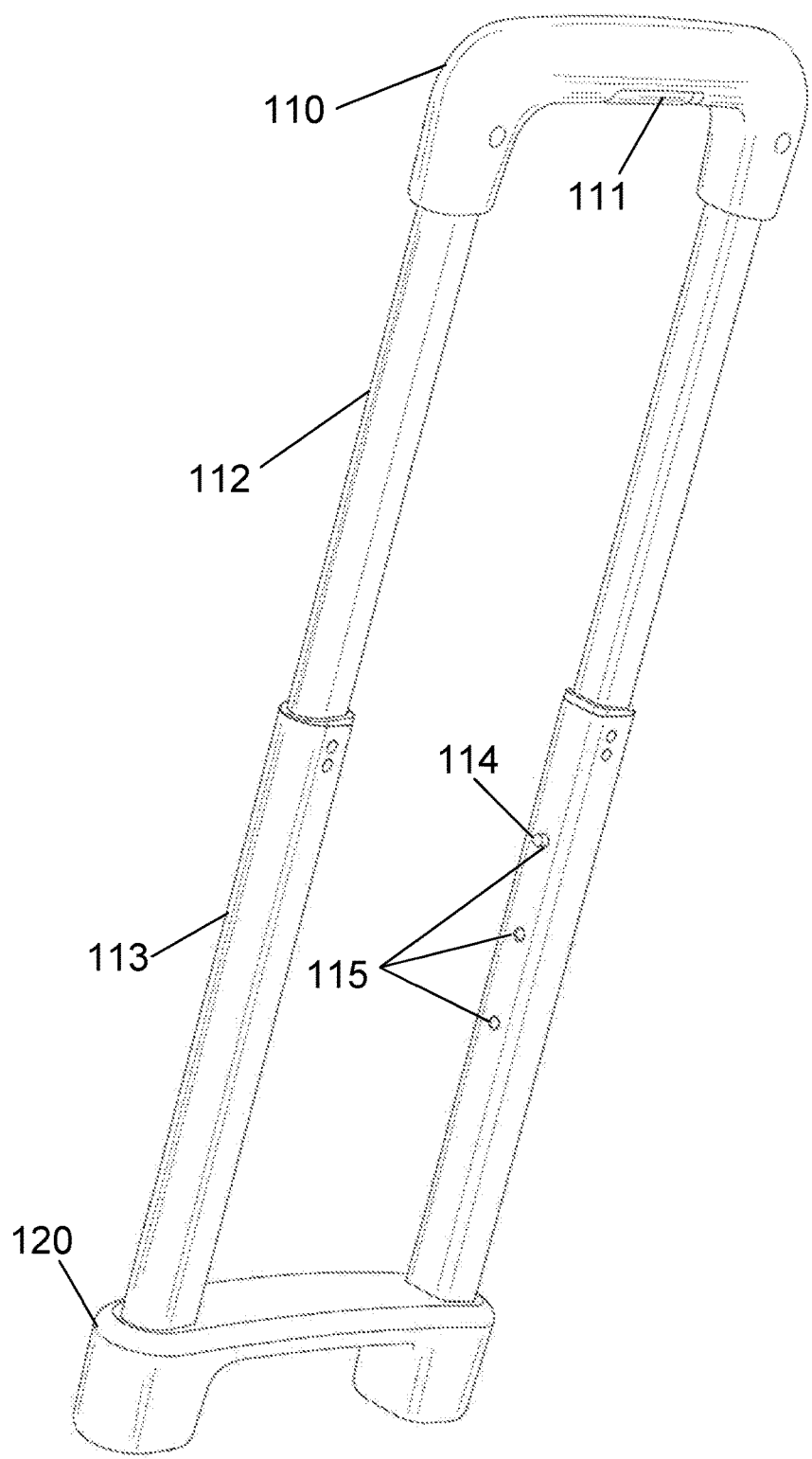
FIG. 7 illustrates a telescopic handle, according to an exemplary embodiment of the present subject disclosure.

FIGS. 3A-3B show front and side view of an extended carrier transport device 100. In the extended position, the telescopic handle 110 may be pulled out all the way so that a first shaft 112, and a second shaft 113 are both fully extended. As shown in more detail in FIG. 7, handle release button 111 works in much the same was as that described for the adjustable bar release button 131. First shaft 112 has an outer dimension that is smaller than an inner dimension of shaft 113, thereby allowing shaft 112 to easily slide within shaft 113 to produce different total lengths of the combination of shaft 112 and shaft 113. Shaft 112 is designed to slide in and fit within the hollow interior of shaft 113, which in turn is designed to slide in and fit within the hollow interior of vertical tube 121. This allows the telescopic handle 110 to lay adjacent to carry handle 120 when the device is fully retracted, as shown in FIG. 1, and to extend away from the carry handle 120, when the device is fully extended, as shown in FIG. 3A. The telescopic handle 110 may be locked into various positions by the interaction of the protrusion 114 positioned on shaft 112 in the various apertures 115 positioned along the length of shaft 113. See FIG. 7. The protrusion 114 is biased outward and locks into any aperture 115 that it aligns with. The handle release button 111 pulls the protrusion 114 back into the lumen of shaft 112 and unlocks the shafts 112 and 113 from each other. The shafts 112 and 113 can then slide as needed to create a distance of the telescopic handle 110 that is suitable for a given user. Three different length positions are shown in FIG. 7, but any number are possible.

As shown in FIG. 3A, adjustable bar 130 is in its bottommost position (similar to position 130A in FIG. 2A). In FIG. 3B, adjustable bar 130 is shown in a slightly higher position (similar to position 130B in FIG. 2A). The hinged base platform 50 is shown in its open position, ready to accommodate a carrier. Two or more wheels 160 are connected between the base structure 140 and the hinged base platform 150. The wheels may be any easily moveable type wheels to facilitate the movement of the device when fully loaded. Examples wheels include, but are not limited to, in-line skate wheels, and other similar low profile, durable, and easy to rotate wheels.

Figure 4:
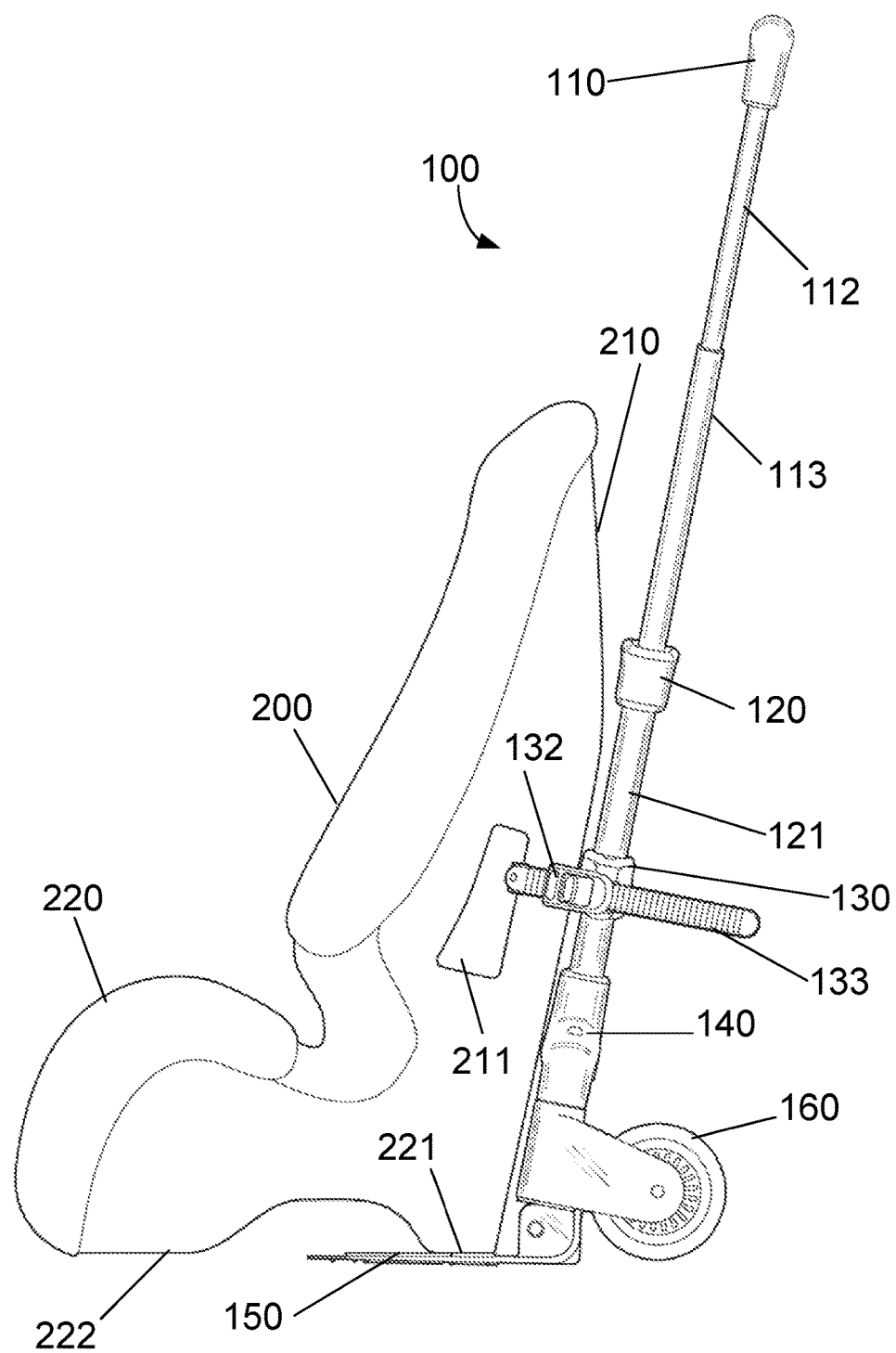
FIG. 4 illustrates a side view of a carrier transporter device securing a conventional carrier, according to an exemplary embodiment of the present subject disclosure.
Figure 5:
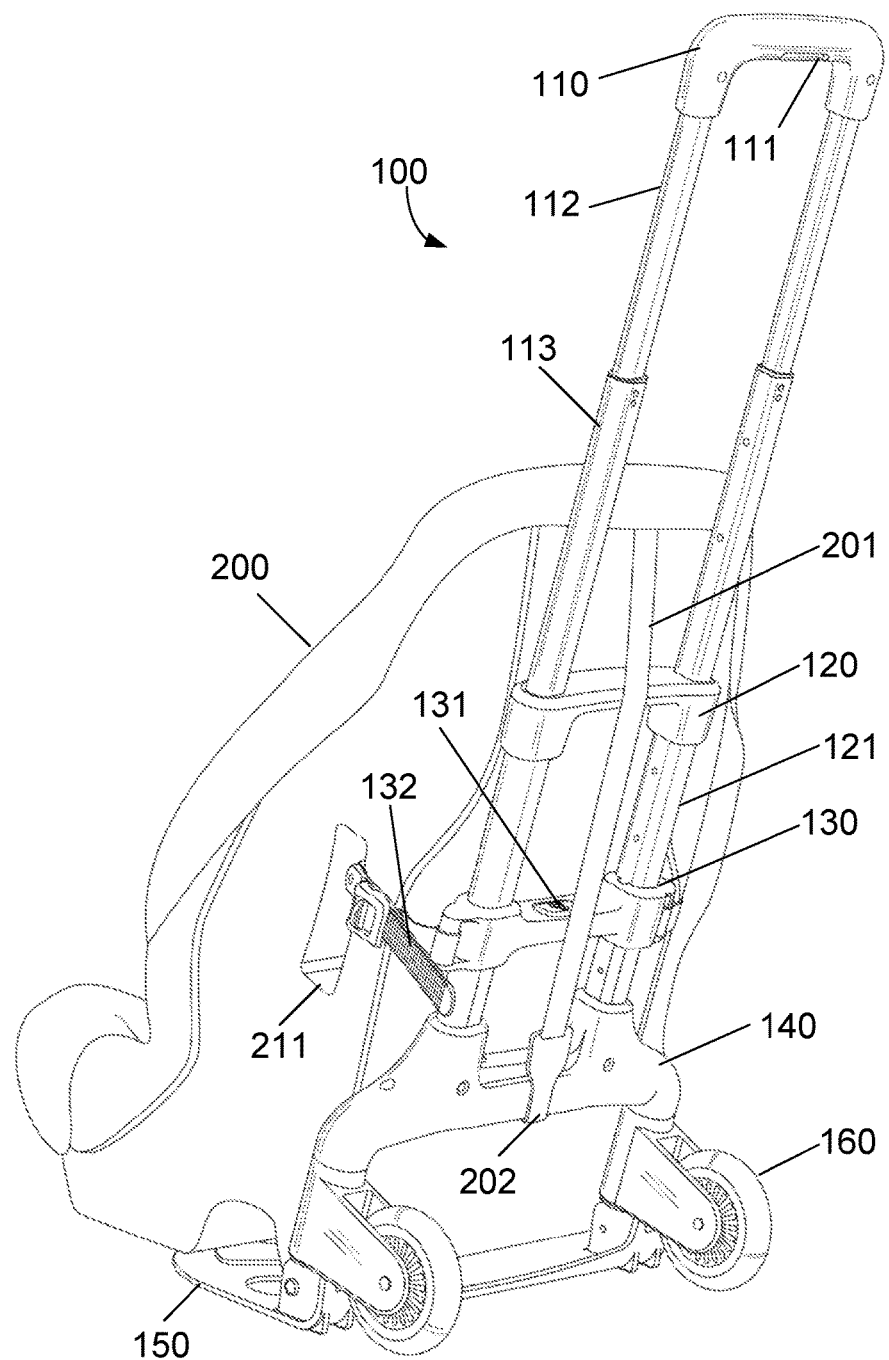
FIG. 5 illustrates a back perspective view of a carrier transporter device securing a carrier, according to an exemplary embodiment of the present subject disclosure.

FIGS. 4-5 show the relative positioning of the components of the carrier transport device 100 when a carrier 200 is placed thereon. Carrier 200 may be a conventional car seat, infant carrier or the like, having a top back support shell 210, and a seat portion 220. The back support shell 210 and seat portion 220 typically form an angle, which can be 90 degrees or more. The seat portion 220 of the carrier 200 can have a front extended leg support portion 222 and a back support base 221. A belt path 211, such as a car seat belt path or similar aperture, opening or guide, is typically positioned on a mid-body portion of the carrier 200. In use, the carrier 200 is placed on the device 100 so that the back support base 221 is positioned on the furthest back portion of the base platform 150 so as to abut the lowest end of the base structure 140. The adjustable bar 130 is then moved vertically up or down on the vertical tubes 121 to position the adjustable bar 130 in line with the belt path 211 of the car seat 200, as shown in FIG. 4. The securing mechanism 132 is then used to secure the carrier 200 to the adjustable bar 130. For example, a strap 133 may be guided through one side of the belt path 211 and retrieved from the other of the belt path 211 and secured back to the adjustable bar 130 by guiding it through the locking buckle 134. The end of the strap 133 may be pulled tight to ensure a snug fit between the carrier 200 and the carrier transport device 100. During this process, care should be given to ensure that the back support base 221 does not slide away from its position adjacent the back end of the base platform 150, as shown in FIG. 4.

Figure 6:
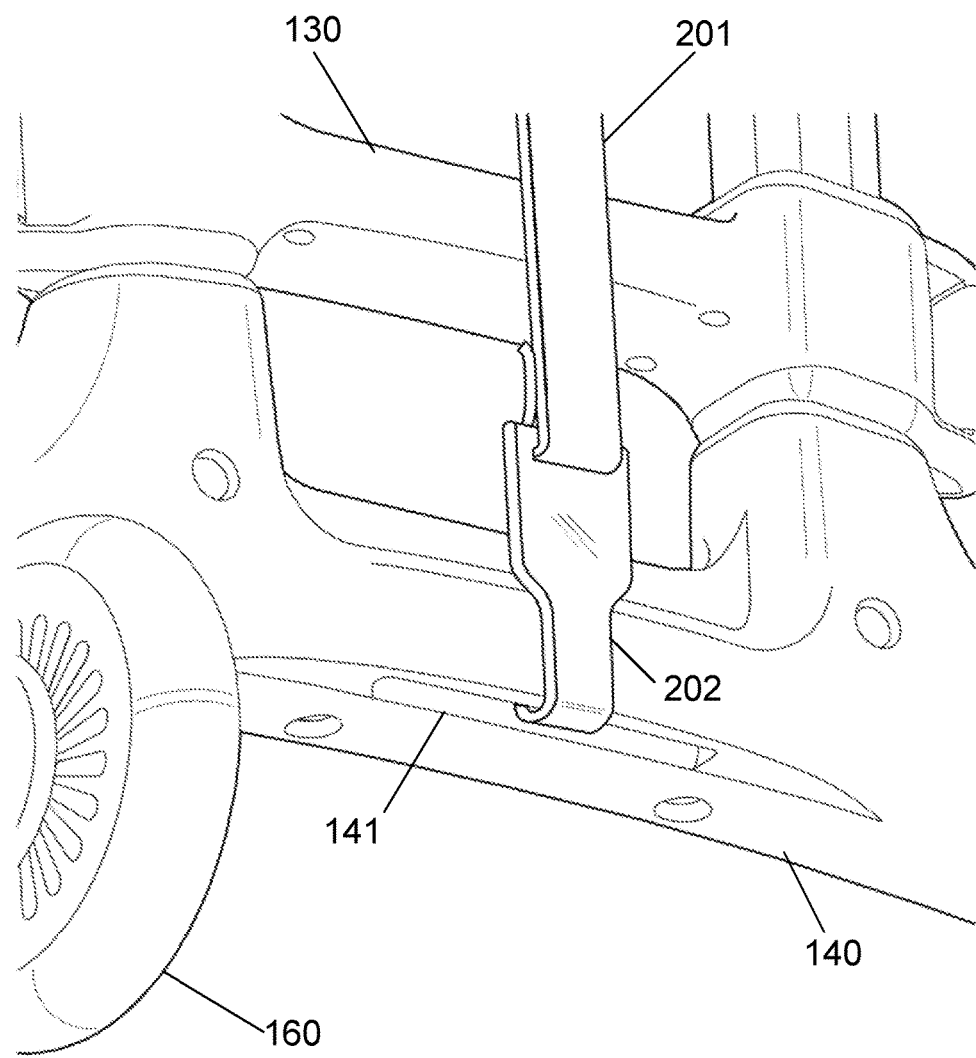
FIG. 6 illustrates a tether anchor point, according to an exemplary embodiment of the present subject disclosure.

If the carrier 200 has a tether strap 201 with anchor 202, then the anchor 202 may be secured into an anchor point 141 located at the bottom of the base structure 140, as shown in FIGS. 5 and 6. Once the tether 201 is anchored into anchor point 141, the tether 201 may be tightened on the carrier 200 to promote a further secure connection between the carrier 200 and the transporter 100.

At least four secure connections are created using the technique of securing the carrier 200 to the carrier transporter device 100. The first is the support of the back support base 221 on to the base platform 150. The second is the strapping in of the carrier 200 to the transporter 100 through the strap 133 at the adjustable bar 130. And the third being the securing of the tether anchor 202 to the anchor securing point 141. The combination of these three secure connections ensures that the carrier 200 remains stable and secure as it is transported by the transporter device 100. A fourth is the grip passing 152 as described below.

Figure 8:
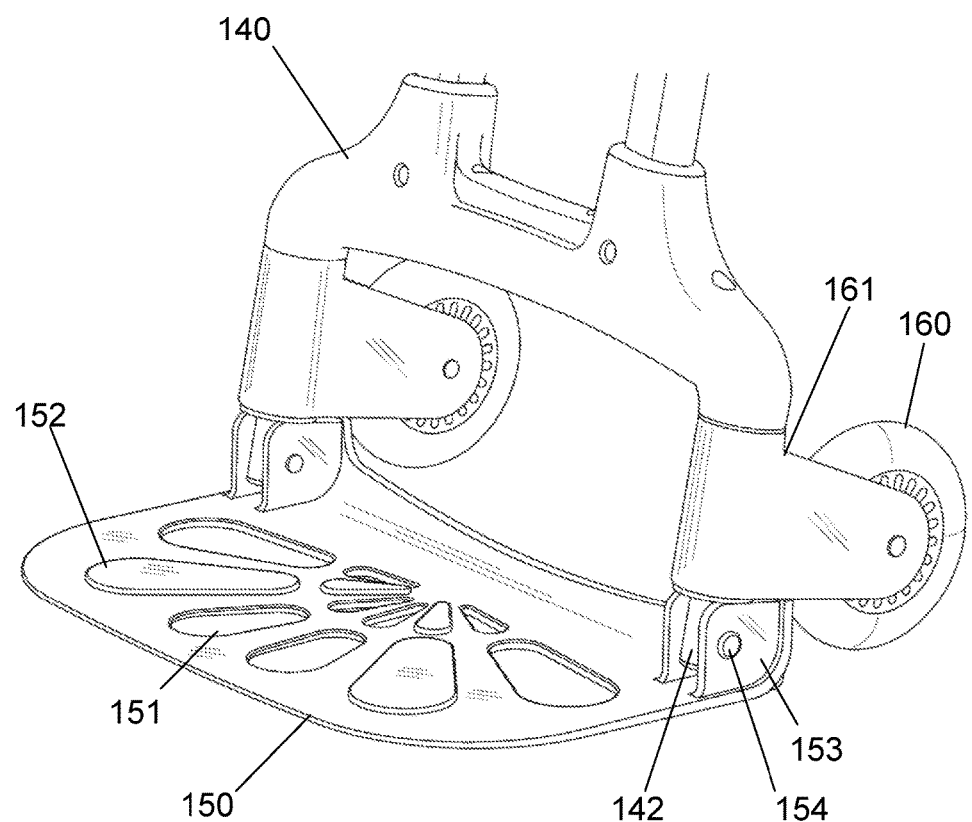
FIG. 8 illustrates a platform assembly, according to an exemplary embodiment of the present subject disclosure.

FIG. 8 shows a perspective view of the extended base platform 150 in an open position. The base platform 150 contains one or more apertures 151, one or more of which may have grip padding 152 to help secure the carrier 200 during movement, particularly over uneven grounding or other movement. Grip padding 152 may be any polymeric material which creates a higher friction surface between the carrier 200 and the base platform 150. The base structure 140 has a base shaft 142 which secures the base platform 150 and the wheel 160 and wheel base 161. Base platform 150 is connected to base shaft 142 through a hinge screw 154 secured by wall 153. The wheel base 161 encircles and is connected to the base shaft 142.

Figure 9A:
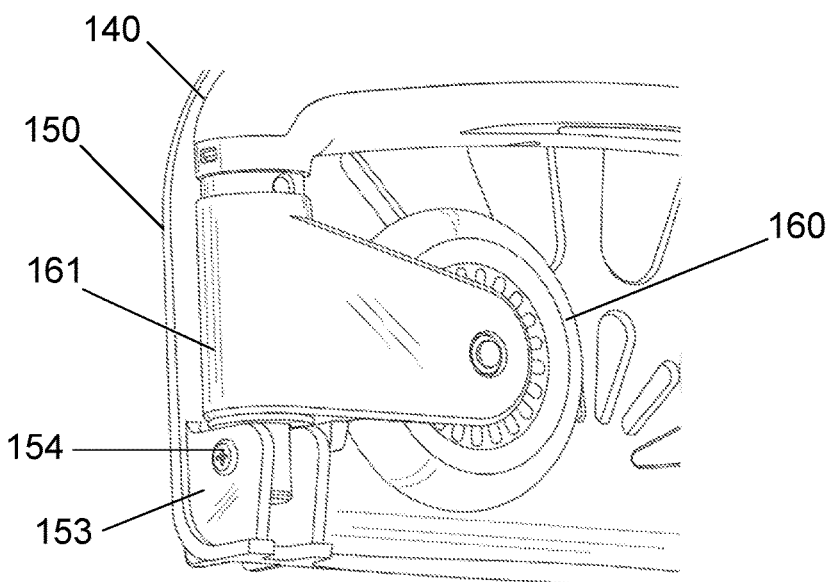
FIGS. 9A-9B illustrate a perspective view of retracted and extended wheels, according to an exemplary embodiment of the present subject disclosure.
Figure 9B:
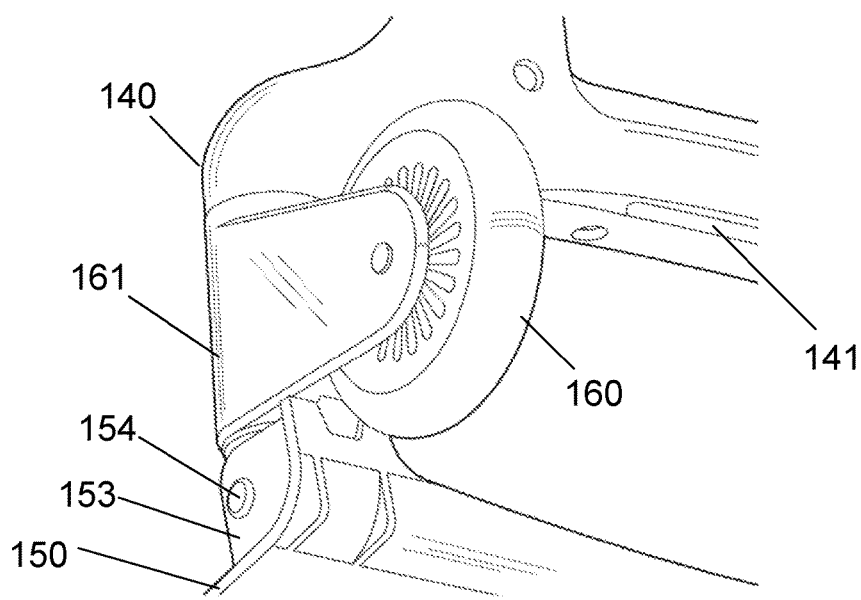
Figures 10A, 10B:
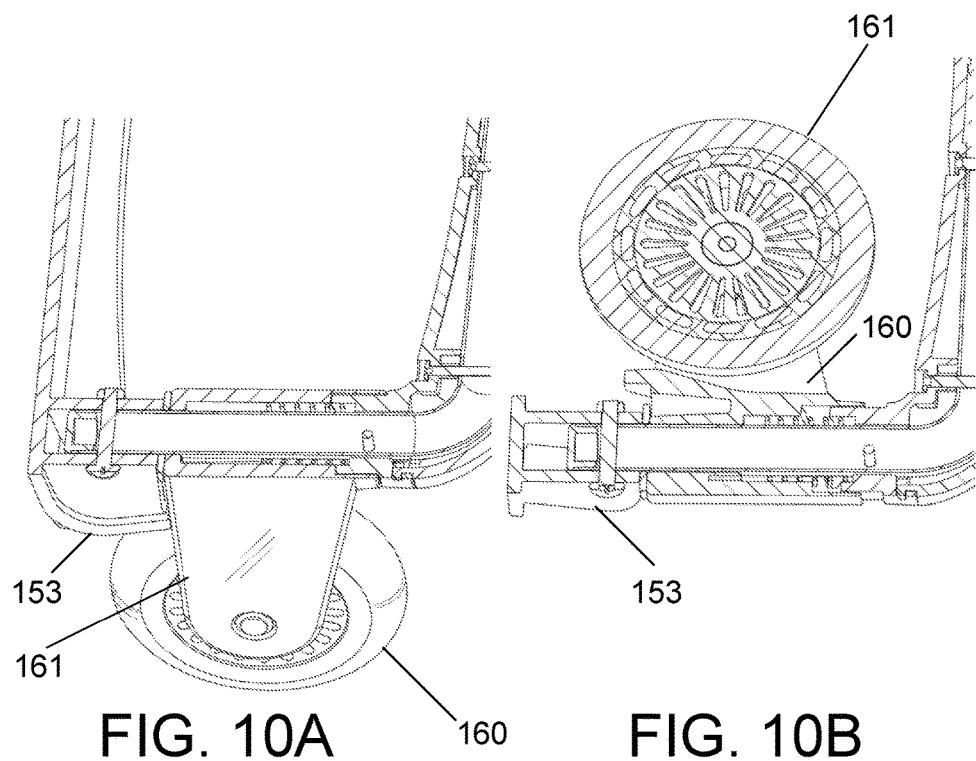
FIGS. 10A-10B illustrate a planar cut view of retracted and extended wheels, according to an exemplary embodiment of the present subject disclosure.

FIGS. 9A-9B show a back perspective view of the base structure 140 portion with the base platform 150 and wheels 160 in the retracted (FIG. 9A), and extended (FIG. 9B) positions, respectively. When in the retracted position, base platform 150 abuts against the front face of the base structure 140, and the wheels 160 and wheel base 161 abut against the retracted top surface of the base platform 150. When the base platform 150 is extended out, wall 153 rotates about hinge point 154, and pushes up against an internal mechanism of the base shaft 142, thereby swinging the wheel blade 161 and wheels 160 outwards 90 degrees. FIGS. 10A-10B illustrate the mechanism that connects the movement of the base platform 150 to the swinging of the wheels 161.

Although the description of this subject matter has been made with respect to the transport of conventional carriers, such as convertible and car seats, the device is not limited to such products. Other types of infant chairs, toys or any other object that may be strapped down by the securing mechanisms 132 of the adjustable bar 130 and be transported may also be used in accordance with the present subject disclosure.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A transporter comprising:
   a carry handle;
   a telescopic handle extendable from the carry handle;
   a base connected to the carry handle through an elongated shaft;
   a bar positioned on the elongated shaft, the bar having a securing device to secure an object thereto, wherein the bar is adapted to move along an entire length between the carry handle and the base and is lockable at a plurality of pre-determined positions along the elongated shaft by insertion of a horizontal bar from the bar into a corresponding hole in the elongated shaft;
   a base platform extending from the base; and
   a release button on the bar which retracts the horizontal bar from the corresponding hole in the elongated shaft.

2. The transporter of claim 1, wherein the securing device includes a strap and a buckle.

3. The transporter of claim 2, wherein the strap is adjustable in length.

4. The transporter of claim 3, wherein the strap is adapted to wind through a belt path of a carrier and secure the carrier to the bar.

5. The transporter of claim 1, wherein the telescopic handle is lockable at a plurality of pre-determined positions.

6. The transporter of claim 5, further comprising a release button on the telescopic handle which releases the telescopic handle from being locked in one of the pre-determined positions.

7. The transporter of claim 5, wherein in a retracted position, the telescopic handle abuts the carry handle.

8. The transporter of claim 1, wherein in a retracted position, the base platform is parallel to the base, and in an extended position, the base platform is substantially perpendicular to the base.

9. The transporter of claim 1, further comprising wheels positioned between the base and the base platform.

10. The transporter of claim 9, wherein in a retracted position, the wheels are parallel to the base platform, and in an extended position, the wheels are substantially perpendicular to the base platform.

11. The transporter of claim 9, wherein in a retracted position, the wheels are parallel to the base platform, and in an extended position, the wheels and the base platform independently extend away from each other.

12. The transporter of claim 1, further comprising an anchor point positioned on the base and adapted to secure an anchor from a tether strap on a carrier.

13. A transporter comprising:
    a carry handle;
    a telescopic handle extendable from the carry handle;
    a base connected to the carry handle through an elongated shaft;
    a bar positioned on the elongated shaft, the bar having a strap and a buckle to secure a carrier thereto by connecting with its belt path, wherein the bar is moveable at pre-determined positions between the carry handle and the base, and includes a release button thereon to release the bar from any of the pre-determined positions, wherein the bar is adapted to move along an entire length between the carry handle and the base; and
    a base platform extending from the base.

14. The transporter of claim 13, wherein the telescopic handle is lockable at a plurality of pre-determined positions.

15. The transporter of claim 14, further comprising a release button on the telescopic handle which releases the telescopic handle from being locked in one of the pre-determined positions.

16. The transporter of claim 13, further comprising wheels positioned between the base and the base platform.

17. The transporter of claim 13, further comprising an anchor point positioned on the base and adapted to secure an anchor from a tether strap on a carrier.

* * * * *